US012644030B2

(12) United States Patent
Yamate

(10) Patent No.: US 12,644,030 B2
(45) Date of Patent: Jun. 2, 2026

(54) ADHESIVE COMPOSITION

(71) Applicant: NIPPON SODA CO., LTD., Tokyo (JP)

(72) Inventor: Taiki Yamate, Chiba (JP)

(73) Assignee: NIPPON SODA CO., LTD., Tokyo (JP)

( * ) Notice: Subject to any disclaimer, the term of this patent is extended or adjusted under 35 U.S.C. 154(b) by 840 days.

(21) Appl. No.: 17/913,691

(22) PCT Filed: Apr. 1, 2021

(86) PCT No.: PCT/JP2021/014132
§ 371 (c)(1),
(2) Date: Sep. 22, 2022

(87) PCT Pub. No.: WO2021/201208
PCT Pub. Date: Oct. 7, 2021

(65) Prior Publication Data

US 2023/0120998 A1 Apr. 20, 2023

(30) Foreign Application Priority Data

Apr. 3, 2020 (JP) ................................. 2020-067404

(51) Int. Cl.

| | |
|---|---|
| ***C09J 133/10*** | (2006.01) |
| ***C08F 265/06*** | (2006.01) |
| ***C08K 5/101*** | (2006.01) |
| ***C08K 5/51*** | (2006.01) |
| ***C08L 33/26*** | (2006.01) |
| ***C09D 4/00*** | (2006.01) |
| ***C09D 133/14*** | (2006.01) |
| ***C09D 201/02*** | (2006.01) |
| ***C09J 4/06*** | (2006.01) |
| ***C09J 11/06*** | (2006.01) |
| ***C09J 133/14*** | (2006.01) |
| ***C09J 133/26*** | (2006.01) |
| ***C09J 201/02*** | (2006.01) |
| *C08K 5/14* | (2006.01) |
| *C08K 5/5397* | (2006.01) |
| *C09D 4/06* | (2006.01) |
| *C09D 5/00* | (2006.01) |
| *C09J 4/00* | (2006.01) |
| *C09J 133/08* | (2006.01) |

(52) U.S. Cl.

CPC ........... *C09J 133/10* (2013.01); *C08F 265/06* (2013.01); *C08K 5/101* (2013.01); *C08K 5/51* (2013.01); *C08L 33/26* (2013.01); *C09D 4/00* (2013.01); *C09D 133/14* (2013.01); *C09D 201/02* (2013.01); *C09J 4/06* (2013.01); *C09J 11/06* (2013.01); *C09J 133/14* (2013.01); *C09J 133/26* (2013.01); *C09J 201/02* (2013.01); *C08K 5/14* (2013.01); *C08K 5/5397* (2013.01); *C09D 4/06* (2013.01); *C09D 5/002* (2013.01); *C09J 4/00* (2013.01); *C09J 133/08* (2013.01); *C09J 2301/408* (2020.08); *C09J 2400/226* (2013.01)

(58) Field of Classification Search
None
See application file for complete search history.

(56) References Cited

U.S. PATENT DOCUMENTS

2021/0284879 A1 9/2021 Yamate
2021/0347726 A1 11/2021 Yamate

FOREIGN PATENT DOCUMENTS

WO 2018/070079 4/2018
WO WO-2018070079 A1 * 4/2018 ........... C09D 133/24
WO WO-2019198792 A1 * 10/2019 ............ C09J 201/00
WO 2020/071456 4/2020
WO 2020/262423 12/2020

OTHER PUBLICATIONS

Official Communication issued in International Patent Application No. PCT/JP2021/014132, dated Jul. 6, 2021, along with English translation.
Yamate et al., "Polyacrylamide-scaffold adhesive bearing multiple benzene rings forming CH/π interactions with polyolefin", Advanced Materials Letters, 2018, vol. 9, Issue 7, pp. 526-530.

* cited by examiner

*Primary Examiner* — Eli D. Strah
(74) *Attorney, Agent, or Firm* — Greenblum & Bernstein, P.L.C.

(57) ABSTRACT

An adhesive composition of the present application includes the following components (A) to (C): (A) a radically polymerizable compound; (B) a polymer having a weight-average molecular weight of 35,000 to 110,000 and having a repeat unit derived from a polymerizable compound of formula (I) (wherein $X^1$ and $X^2$ each independently represent a C7 to C20 alkyl group or a C7 to C20 alkoxy group, n represents 0 or 1, $Z^1$ and $Z^2$ each independently represent a single bond or a Cl to C3 alkylene group, each R independently represents an organic group or a halogeno group, m1 and m2 each independently represent any integer of 0 to 4, and Y represents a polymerizable functional group); and (C) a radical polymerization initiator.

(I)

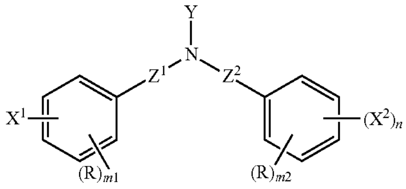

9 Claims, No Drawings

ADHESIVE COMPOSITION

TECHNICAL FIELD

The present invention relates to an adhesive composition. The present application claims the priority based on Japanese Patent Application No. 2020-067404 filed on Apr. 3, 2020, the contents of which are incorporated herein by reference.

BACKGROUND ART

Radically curable adhesive agents composed mainly of (meth)acrylate permit various curing approaches such as light curing, heat curing, anaerobic curing, and two-component mixing curing, and have heretofore been used in a wide range of fields such as automobiles and transport planes, electric and electronic components, aircrafts, building materials, sports goods, civil engineering, packaging, and medicine. However, the conventional radically curable adhesive agents have difficult in attaining, with one agent, balanced adhesion of various plastic resins such as low-surface energy resin base materials, for example, polyethylene (PE), polypropylene (PP), polytetrafluoroethylene (PTFE), polyacetal (POM), nylon 6 (PA6), polyethylene terephthalate (PET), polybutylene terephthalate (PBT), polydimethylsilicone (PDMS), polyether ether ketone (PEEK), modified polyphenylene ether (PPE), polyphenylene sulfide (PPS), cycloolefin polymer (COP), cycloolefin copolymer (COC), polymethylpentene (PMP), and liquid crystal polyester (LCP), or high-surface energy resin base materials, for example, polyvinyl chloride (PVC), polycarbonate (PC), and polymethyl methacrylate (PMMA).

For example, patent document 1 discloses a plastic film or an active energy line-curable adhesive composition for a sheet, comprising predetermined amounts of urethane (meth)acrylate, an ethylenic unsaturated group-containing compound having a hydroxy group in the molecule, an ethylenic unsaturated group-containing compound whose homopolymer has a glass transition temperature of 50° C. or higher, and an ethylenic unsaturated group-containing compound whose homopolymer has a glass transition temperature of 20° C. or lower.

PRIOR ART DOCUMENTS

Patent Document

Patent Document 1: Japanese unexamined Patent Application Publication No. 2014-009339

SUMMARY OF THE INVENTION

Object to be Solved by the Invention

However, the plastic film or the active energy line-curable adhesive composition for a sheet disclosed in patent document 1 has difficulty in attaining balanced adhesion of various plastics.

The present invention has been made in light of these circumstances, and an object of the present invention is to provide an adhesive composition excellent in adhesive force to various difficult-to-bond materials.

Means to Solve the Object

The present invention is as follows.

(1) An adhesive composition comprising the following components (A) to (C):

(A) a radically polymerizable compound;

(B) a polymer having a weight-average molecular weight of 35,000 to 110,000 and having a repeat unit derived from a polymerizable compound of formula (I):

(I)

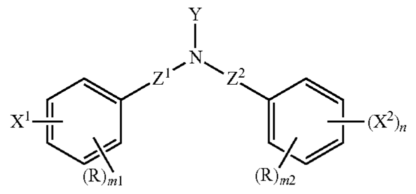

(wherein $X^1$ and $X^2$ each independently represent a C7 to C20 alkyl group or a C7 to C20 alkoxy group, n represents 0 or 1, $Z^2$ and $Z^2$ each independently represent a single bond or a C1 to C3 alkylene group, each R independently represents an organic group or a halogeno group, m1 and m2 each independently represent any integer of 0 to 4, and Y represents a polymerizable functional group); and (C) a radical polymerization initiator.

(2) The adhesive composition according to (1), wherein in formula (I), Y is an acryloyl group or a methacryloyl group.

(3) The adhesive composition according to (1) or (2), wherein the polymer having a repeat unit derived from a polymerizable compound of formula (I) is a copolymer having the repeat unit derived from a polymerizable compound of formula (I) and a repeat unit derived from (meth)acrylic acid ester.

(4) The adhesive composition according to any one of (1) to (3), wherein the adhesive composition is an adhesive composition for a plastic base material.

(5) The adhesive composition according to any one of (1) to (4), wherein the radical polymerization initiator (C) is a photopolymerization initiator.

(6) The adhesive composition according to any one of (1) to (4), wherein the radical polymerization initiator (C) is an organic peroxide.

(7) The adhesive composition according to (5), wherein the adhesive composition is a coating agent.

(8) The adhesive composition according to (7), wherein the coating agent is a primer.

(9) The adhesive composition according to (5) or (6), wherein the adhesive composition is an adhesive agent.

(10) A compact obtained by applying an adhesive composition according to any one of (1) to (9) onto a plastic base material, and curing the adhesive composition so that the resulting layer is disposed on the base material or between base materials.

Effect of the Invention

The present invention may provide an adhesive composition excellent in adhesive force to various difficult-to-bond materials such as polyethylene terephthalate, polyethylene, polypropylene, modified polyphenylene ether, polyphenylene sulfide, and cycloolefin polymer.

MODE OF CARRYING OUT THE INVENTION

Hereinafter, the present embodiment will be described in detail.

<Component (A)> Radically Polymerizable Compound

The radically polymerizable compound is not particularly limited, but a monomer having a group having an unsaturated double bond such as a vinyl group, an allyl group, or a (meth)acryloyl group, an oligomer or a polymer thereof, or the like may be used. In the present invention, the "(meth) acryloyl group" means an "acryloyl group" and/or a "methacryloyl group".

As the radically polymerizable compound, preferably, monofunctional or polyfunctional (meth)acrylate, (meth) acrylamide, an oligomer thereof, or the like may be used.

As the monofunctional (meth)acrylate monomer, methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, 2-ethylhexyl (meth) acrylate, isooctyl (meth)acrylate, lauryl (meth)acrylate, stearyl (meth)acrylate, isononyl (meth)acrylate, cyclohexyl (meth)acrylate, dicyclopentanyl (meth)acrylate, dicyclopentenyl (meth)acrylate, dicyclopentenyloxyethyl (meth)acrylate, isobornyl (meth)acrylate, methoxylated cyclodecatriene (meth)acrylate, 2-methoxyethyl (meth)acrylate, 2-ethoxyethyl (meth)acrylate, diethylene glycol monomethyl ether (meth)acrylate, glycidyl (meth)acrylate, furfuryl (meth)acrylate, epoxy (meth)acrylate, tetrahydrofurfuryl (meth)acrylate, 3-ethyl-3-oxetanylmethyl (meth)acrylate, (2-methyl-ethyl-1,3-dioxolan-4-yl)methyl (meth)acrylate, cyclic trimethylolpropane formal (meth)acrylate, γ-butyrolactone (meth)acrylate, dioxolane (meth)acrylate, oxetane (meth)acrylate, (meth)acryloylmorpholine, phenyl (meth) acrylate, benzyl (meth)acrylate, methylbenzyl (meth)acrylate, ethylbenzyl (meth)acrylate, propylbenzyl (meth)acrylate, methoxybenzyl (meth)acrylate, phenoxyethyl (meth) acrylate, chlorobenzyl (meth)acrylate, nonylphenoxy polyethylene glycol (meth)acrylate or the like is exemplified.

The polyfunctional (meth)acrylate monomer is a monomer having two or more, preferably two to six, (meth) acrylate groups in the molecule. For example, difunctional (meth)acrylate such as neopentyl glycol di(meth)acrylate, stearic acid-modified pentaerythritol di(meth)acrylate, dicyclopentenyl diacrylate, di(meth)acryloyl isocyanurate, alkylene oxide-modified bisphenol di(meth)acrylate, dioxane glycol di(meth)acrylate, 2,2-bis(4-(meth)acryloxyphenyl)propane, 2,2-bis(4-(meth)acryloxyethoxyphenyl) propane, 2,2-bis(4-(meth)acryloxydiethoxyphenyl)propane, 2,2-bis(4-(meth)acryloxypropoxyphenyl)propane, 2,2-bis (4-(meth)acryloxytetraethoxyphenyl)propane, and 2,2-bis (4-(meth)acryloxypolyethoxyphenyl)propane; and trifunctional or higher (meth)acrylate such as trimethylolpropane tri(meth)acrylate, pentaerythritol tri(meth)acrylate, tris (acryloyloxyethyl) isocyanurate, ditrimethylolpropane tetra (meth)acrylate, pentaerythritol tetra(meth)acrylate, dipentaerythritol monohydroxy penta(meth)acrylate, alkyl-modified dipentaerythritol pentaacrylate, and dipentaerythritol hexa(meth)acrylate are exemplified.

As the (meth)acrylate oligomer, urethane (meth)acrylate of a polybutadiene skeleton, urethane (meth)acrylate of a hydrogenated polybutadiene skeleton, urethane (meth)acrylate of a polycarbonate skeleton, urethane (meth)acrylate of a polyether skeleton, urethane (meth)acrylate of a polyester skeleton, urethane (meth)acrylate of a castor oil skeleton, isoprene (meth)acrylate, hydrogenated isoprene (meth)acrylate, epoxy (meth)acrylate oligomer or the like is exemplified.

One of these monofunctional or polyfunctional (meth) acrylate monomers or (meth)acrylate oligomers, or a combination of two or more thereof may be used.

As the (meth)acrylamide, dimethyl(meth)acrylamide, diethyl(meth)acrylamide, isopropylacrylamide or the like may be exemplified.

A radically polymerizable compound other than the (meth)acrylate or the (meth)acrylamide may be appropriately selected according to intended physical properties such as melting point, viscosity or refractive index. This compound is not particularly limited, but the following compounds are specifically exemplified.

styrene; maleic anhydride; vinyl compounds such as vinyl acetate, vinyl chloride, vinylidene chloride, acrylonitrile, vinyl ether, acrolein, and divinylbenzene; olefin compounds such as ethylene, propylene, and butadiene; or the like.

<Component (B)> Polymer Having Repeat Unit Derived from Polymerizable Compound of Formula (I)

The component (B) is a polymer having a repeat unit derived from a polymerizable compound of formula (I):

(I)

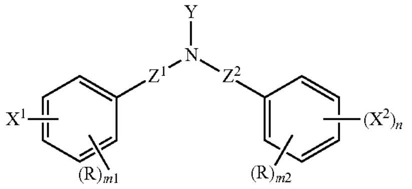

(wherein $X^1$ and $X^2$ each independently represent a C7 to C20 alkyl group or a C7 to C20 alkoxy group, n represents 0 or 1, $Z^2$ and $Z^2$ each independently represent a single bond or a C1 to C3 alkylene group, each R independently represents an organic group or a halogeno group, m1 and m2 each independently represent any integer of 0 to 4, and Y represents a polymerizable functional group), and has a weight-average molecular weight of 35,000 to 110,000.

The polymer having a repeat unit derived from a polymerizable compound of formula (I) refers to a polymer having one or more repeat units each derived from a polymerizable compound of formula (I).

The polymer having a repeat unit derived from a polymerizable compound of formula (I) may further have a repeat unit derived from (meth)acrylic acid ester as a repeat unit derived from another radically polymerizable compound other than the compound of formula (I).

A copolymer consisting of two or more repeat units each derived from a polymerizable compound of formula (I), or a copolymer consisting of the repeat unit derived from a polymerizable compound of formula (I) and a repeat unit derived from (meth)acrylic acid ester may have a random sequence, an alternate sequence, or a block sequence of the respective repeat units.

The copolymer may have a linear or branched molecular chain. As the branched chain, a branched chain having one branch point (star shaped), a branched chain having a plurality of branch points (graft shaped) or the like is exemplified.

(Polymerizable Compound of Formula (I))

In the formula (I), $X^1$ and $X^2$ each independently represent a C7 to C20 alkyl group or a C7 to C20 alkoxy group.

For $X^1$ and $X^2$, the C7 to C20 alkyl group may be preferably used in a linear or branched form.

As the linear form, a n-heptyl group, a n-octyl group, a n-nonyl group, a n-decyl group, a n-dodecyl group, a n-tridecyl group, a n-tetradecyl group, a n-hexadecyl group, a n-octadecyl group, a n-eicosyl group or the like is exemplified.

As the branched form, a 1,1,2,2-tetramethylpropyl group, a 1,1,3-trimethylbutyl group, a 1-ethylpentyl group, a 1,1,3,3-tetramethylbutyl group, a 2,2,3,3-tetramethylbutyl group, a 1,2,4-trimethylpentyl group, a 2,4,4-trimethylpentyl group, a 2,2,4-trimethylpentyl group, a 1-ethyl-4-methylpentyl group, a 3-ethyl-3-methylpentyl group, a 3-ethyl-4-methylpentyl group, a 1-ethyl-1-methylpentyl group, a 1,1-dimethylhexyl group, a 3,3-dimethylhexyl group, a 4,4-dimethylhexyl group, a 2-ethylhexyl group, a 3-ethylhexyl group, a 6-methylheptyl group, a 1,3,5-trimethylhexyl group, a 1,1,3-trimethylhexyl group, a 1-butyl-1-methylheptyl group, a 1-methylheptyl group, a 1-methyl-1-octylundecyl group or the like is exemplified.

For $X^1$ and $X^2$, the C7 to C20 alkoxy group may be preferably used in a linear or branched form.

As the linear form, a n-heptyloxy group, a n-octyloxy group, a n-nonyloxy group, a n-decyloxy group, a n-dodecyloxy group, a n-tridecyloxy group, a n-tetradecyloxy group, a n-hexadecyloxy group, n-octadecyloxy group, a n-eicosyloxy group or the like is exemplified.

As the branched form, a 1,1,2,2-tetramethylpropyloxy group, a 1,1,3-trimethylbutyloxy group, a 1-ethylpentyloxy group, a 1,1,3,3-tetramethylbutyloxy group, a 2,2,3,3-tetramethylbutyloxy group, a 1,2,4-trimethylpentyloxy group, a 2,4,4-trimethylpentyloxy group, a 2,2,4-trimethylpentyloxy group, a 1-ethyl-4-methylpentyloxy group, a 3-ethyl-3-methylpentyloxy group, a 3-ethyl-4-methylpentyloxy group, a 1-ethyl-1-methylpentyloxy group, a 1,1-dimethylhexyloxy group, a 3,3-dimethylhexyloxy group, a 4,4-dimethylhexyloxy group, a 2-ethylhexyloxy group, a 3-ethylhexyloxy group, a 6-methylheptyloxy group, a 1,3,5-trimethylhexyloxy group, a 1,1,3-trimethylhexyloxy group, a 1-butyl-1-methylheptyloxy group, a 1-methylheptyloxy group, a 1-methyl-1-octylundecyloxy group or the like is exemplified.

In the formula, n represents 0 or 1.

In the formula, $Z^1$ and $Z^2$ each independently represent a single bond or a C1 to C3 alkylene group.

As the C1 to C3 alkylene group for $Z^1$ and $Z^2$, methylene, ethylene, propane-1,3-diyl or the like is exemplified.

In the formula, R represents an organic group or a halogeno group.

The organic group is not particularly limited as long as the organic group is chemically accepted and has the effect of the present invention. As the organic group, a C1 to C6 alkyl group such as a methyl group, an ethyl group, a n-propyl group, an i-propyl group, a n-butyl group, a s-butyl group, an i-butyl group, a t-butyl group, a n-pentyl group, and a n-hexyl group, a C6 to C10 aryl group such as a phenyl group and a naphthyl group, a C1 to C6 alkoxy group such as a methoxy group, an ethoxy group, a n-propoxy group, an i-propoxy group, a n-butoxy group, a s-butoxy group, an i-butoxy group, and a t-butoxy group, a C1 to C6 haloalkyl group such as a chloromethyl group, a chloroethyl group, a trifluoromethyl group, a 1,2-dichloro-n-propyl group, a 1-fluoro-n-butyl group, and a perfluoro-n-pentyl group, or the like is exemplified.

As the halogeno group, a fluoro group, a chloro group, a bromo group, an iodo group is exemplified.

In the formula, m1 and m2 each independently represent any integer of 0 to 4.

In the formula, Y represents a polymerizable functional group. As the polymerizable functional group, a polymerizable group having a carbon-carbon double bond such as a vinyl group, an allyl group, an acryloyl group, a methacryloyl group, a vinyloxycarbonyl group, a prop-1-en-2-yloxycarbonyl group, and an allyloxycarbonyl group, or the like is exemplified.

In the present invention, Y is preferably an acryloyl group or a methacryloyl group.

The formula (I) encompasses a compound of the following formula (II).

(II)

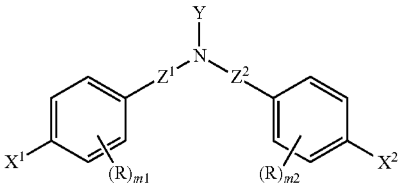

In the formula, Y, $Z^1$, $Z^2$, $X^1$, $X^2$, R, m1, m2 are the same as those described in formula (I).

Among the polymerizable compounds of formula (I) or formula (II) used in the present invention, preferably, N,N-bis(4-(1,1,3,3-tetramethylbutyl)phenyl)acrylamide, N,N-bis(4-(1,1,3,3-tetramethylbutyl)phenyl)methacrylamide, N-phenyl-N-(4-(2,4,4-trimethylpentan-2-yl)phenyl)acrylamide, N-phenyl-N-(4-(2,4,4-trimethylpentan-2-yl)phenyl)methacrylamide, N,N-bis(4-octylphenyl)acrylamide, N,N-bis(4-octylphenyl)methacrylamide, N-(4-octylphenyl)-N-phenylacrylamide, and N-(4-octylphenyl)-N-phenylmethacrylamide are exemplified.

((Meth)Acrylic Acid Ester)

The (meth)acrylic acid ester is preferably an unsubstituted or optionally substituted C1 to C18 alkyl (meth)acrylic acid ester.

The alkyl (meth)acrylic acid ester may have a linear, branched, or cyclic (alicyclic) alkyl site, and a linear or branched alkyl group is preferred. For the linear or branched alkyl (meth)acrylic acid ester, the alkyl site is preferably C1 to C12.

As the substituent that may be substituted on the (meth)acrylic acid ester, an aliphatic group, a polar group, an aromatic group, a heteroaromatic group or the like may be exemplified, though the substituent is not limited thereto.

As the aliphatic group, an alkyl group such as a methyl group and an ethyl group, an alkenyl group such as a vinyl group and an allyl group, an alkynyl group such as an ethynyl group, or the like is exemplified.

As the polar group, a hydroxy group, an amino group, a tetrahydrofurfuryl group or the like is exemplified. The aromatic group is an aromatic hydrocarbon group containing one or more rings. A phenyl group, a naphthyl group or the like is exemplified.

The heteroaromatic group is an aromatic group having one or more heteroatoms selected from O, S, and N. A pyridinyl group, a thienyl group, a furyl group, a benzimidazolyl group or the like is exemplified.

As the "(meth)acrylate", specifically, methyl (meth)acrylate, ethyl (meth)acrylate, hydroxyethyl (meth)acrylate, n-propyl (meth)acrylate, isopropyl (meth)acrylate, n-butyl (meth)acrylate, i-butyl (meth)acrylate, n-hexyl (meth)acrylate, 2-ethylhexyl (meth)acrylate, decyl (meth)acrylate, lauryl (meth)acrylate, stearyl (meth)acrylate, cyclohexyl (meth) acrylate, trityl (meth)acrylate, 4-t-butylcyclohexyl (meth) acrylate, tetrahydrofurfuryl (meth)acrylate, dimethylaminopropyl (meth)acrylate, (2-acryloyloxyethyl) trimethylaminium chloride, (2-methacryloyloxyethyl)trimethylaminium chloride, (2-acryloyloxyethyl)dimethylbenzylaminium chloride, (2-methacryloyloxyethyl) dimethylbenzylaminium chloride or the like is exemplified.

(Compositional Ratio of Repeat Unit)

When the component (B) used in the present invention has a repeat unit derived from a polymerizable compound of formula (I) and a repeat unit derived from (meth)acrylic acid ester, i.e., is a copolymer consisting of a repeat unit derived from a polymerizable compound of formula (I) and a repeat unit derived from (meth)acrylic acid ester, the contents of the repeat unit derived from a polymerizable compound of formula (I) and the repeat unit derived from (meth)acrylic acid ester in the copolymer are not particularly limited. The molar ratio between the repeat unit derived from a polymerizable compound of formula (I) and the repeat unit derived from (meth)acrylic acid ester may be selected from ranges such as 99.5:0.5 to 60:40, 99:1 to 70:30, 98:2 to 75:25, 95:5 to 80:20, 20:80 to :5:95, and 40:60 to 0.5:99.5.

As the component (B) used in the present invention, a polymer consisting of only a repeat unit derived from a polymerizable compound of formula (I), or a copolymer having a repeat unit derived from a polymerizable compound of formula (I) and a repeat unit derived from (meth) acrylic acid ester may be used without particular limitations. The component (B) may have a repeat unit derived from an additional radically polymerizable compound.

(Additional Radically Polymerizable Compound)

The repeat unit derived from an additional radically polymerizable compound means one or more repeat units each derived from a radically polymerizable compound, other than the repeat unit derived from a polymerizable compound of formula (I) and the repeat unit derived from (meth)acrylic acid ester.

The polymerizable compound other than the polymerizable compound of formula (I) and the (meth)acrylic acid ester may be appropriately selected according to intended physical properties such as melting point, viscosity or refractive index. This compound is not particularly limited, but the following compounds are specifically exemplified.

(meth)acrylamide; styrene; maleic anhydride; vinyl compounds such as vinyl acetate, vinyl chloride, vinylidene chloride, acrylonitrile, vinyl ether, acrolein, and divinylbenzene; olefin compounds such as ethylene, propylene, and butadiene; or the like.

(Methods for Producing Compounds of Formula (I) and Formula (II))

The formula (I) and formula (II), each of which is the polymerizable compound used in the present invention, may be synthesized by methods of Examples or other known methods.

For example, a compound of formula (I) wherein Y is an acryl group or a methacryl group may by produced by the following method.

Secondary amine of formula (I'):

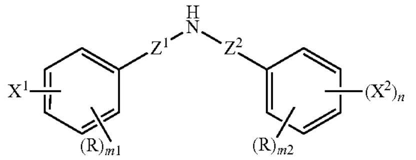

(I')

(wherein $X^1$, $X^2$, n, $Z^1$, $Z^2$, R, m1, m2 are as defined in formula (I))

is reacted with (meth)acrylic acid halide such as (meth) acrylic acid chloride in the presence of a base in a solvent.

As the solvent, an amide solvent such as N,N-dimethylformamide (DMF) and N,N-dimethylacetamide, an ether solvent such as tetrahydrofuran (THF), 1,2-dimethoxyethane, diethyl ether, and methyl cellosolve, aromatic hydrocarbon such as benzene, toluene, xylene, chlorobenzene, dichlorobenzene, and benzonitrile, saturated hydrocarbon such as pentane, hexane, octane, and cyclohexane, halogenated hydrocarbon such as dichloromethane, chloroform, carbon tetrachloride, and 1,2-dichloroethane, or the like is exemplified. One of these solvents or a mixed solvent of two or more thereof may be used.

As the base, an organic base including aromatic amine such as triethylamine and tributylamine, aromatic amine such as pyridine, N-ethylpyridine, N,N-dimethylaniline, and N,N-dimethylaminopyridine, and metal alkoxide such as sodium ethylate and sodium methylate, or an inorganic base including hydroxide of an alkali metal or an alkaline earth metal such as lithium hydroxide, sodium hydroxide, potassium hydroxide, lithium carbonate, sodium carbonate, potassium carbonate, calcium hydroxide, magnesium hydroxide, calcium carbonate, magnesium carbonate, and sodium bicarbonate, and carbonate of an alkali metal or an alkaline earth metal may be used.

The reaction temperature is −50° C. to 200° C.

(Polymerization Method for Polymer)

Any polymer may be used in the present invention without particular limitations as long as the polymer is obtained by the polymerization of only the polymerizable compound of formula (I) or the polymerizable compound of formula (I) and (meth)acrylic acid ester. The polymerization reaction is not particularly limited and may be performed by a known method for synthesizing polyacrylate or the like. Radical polymerization, anionic polymerization, cationic polymerization, ring-opening polymerization, coordination polymerization or the like may be exemplified. One example thereof will be shown in Examples.

For example, in the case of radically polymerizing a compound of formula (I) wherein Y is an acryl group or a methacryl group with a (meth)acrylic acid ester compound, the polymerizable compound of formula (I) or formula (II) and the (meth)acrylic acid ester compound are subjected to polymerization reaction by heating or light irradiation in the presence of a radical polymerization initiator in a solvent.

The polymerization solvent is not particularly limited as long as the solvent is not involved in the polymerization reaction and is compatible with a polymer. Specifically, a nonpolar solvent or a low polar solvent including an ether compound such as diethyl ether, tetrahydrofuran (THF), dioxane, and trioxane, an ester compound such as ethyl acetate, a ketone compound such as methyl ethyl ketone and cyclohexanone, and an aliphatic group, aromatic or alicyclic hydrocarbon compound such as hexane and toluene may be exemplified. These solvents may be used alone or used as a mixed solvent of two or more thereof.

As the radical polymerization initiator, azobisisobutyronitrile, azobis-2,4-dimethylvaleronitrile, azobiscyclohexanecarbonitrile, azobis-2-amidinopropane hydrochloride, potassium peroxodisulfate, ammonium peroxodisulfate, t-butyl hydroperoxide, di-t-butyl cumene hydroperoxide peroxide, acetyl peroxide, benzoyl peroxide, lauroyl peroxide or the like is exemplified.

The molecular weight of the polymer for use in the adhesive composition of the present invention is 35,000 to 110,000, preferably 55,000 to 80,000, in terms of a weight-average molecular weight.

The molecular weight distribution (PDI) of the polymer according to the present invention is preferably 1.0 to 5.0, more preferably 1.0 to 4.0, most preferably 1.0 to 3.0, in terms of a weight-average molecular weight/number-average molecular weight (Mw/Mn) ratio.

The weight-average molecular weight and the number-average molecular weight are values obtained by the conversion of data measured by gel permeation chromatography (GPC) using THF as a solvent, based on the molecular weight of polymethyl methacrylate used as a standard.

In the present specification, the "weight-average molecular weight" refers to a weight-average molecular weight (Mw) based on polystyrene measured by gel permeation chromatography (GPC).

[GPC Measurement Apparatus]

EcoSEC HCL-8320GPC manufactured by Tosoh Corp.

[GPC Measurement Conditions]

GPC column: TSK gel SuperMultipore HZ-M

Flow rate: 0.35 ml/min

Injection volume: 40 μm

Column temperature: 40° C.

System temperature: 40° C.

Eluent: Tetrahydrofuran (Mixing Ratio Between Component (A) and Component (B))

The mixing ratio between the component (A) and the component (B) is not particularly limited, but is preferably 0.1 to 80 parts by mass, more preferably 1 to 50 parts by mass, particularly preferably 1 to 30 parts by mass, of the component (B) with respect to 100 parts by mass of the component (A).

<Component (C)> Radical Polymerization Initiator

As the component (C) that may be used in the present invention, a photo radical polymerization initiator, an organic peroxide or the like is exemplified. The curing pattern of the adhesive composition of the present invention may be selected from light curing, heat curing and redox curing depending on the selected component (C) of the present invention. For example, in the case of imparting "light curability" to the adhesive composition, a photo radical initiator may be selected. In the case of imparting "heat curing or curing through redox reaction" thereto, an organic peroxide may be selected.

The amount of the component (C) mixed is not particularly limited, but 0.01 parts by mass or more and 10 parts by mass or less of the component (C) are preferably added with respect to 100 parts by mass of the component (A). When the amount of the component (C) is 0.01 parts by mass or more, curability is excellent. When the amount of the component (C) is less than 10 parts by mass, the adhesive composition may have favorable preservability. More preferably, 0.04 parts by mass or more and 8 parts by mass or less thereof are added. Further preferably, 0.06 parts by mass or more and 6 parts by mass or less thereof are added.

The photo radical initiator as the component (C) used in the present invention is not limited as long as the photo radical initiator is a compound that generates a radical by irradiation with an active energy line. As the component (C), an acetophenone photo radical initiator, a benzoin photo radical initiator, a benzophenone photo radical initiator, a thioxanthone photo radical initiator, an acylphosphine oxide photo radical initiator, a titanocene photo radical initiator or the like is exemplified. Among them, an acetophenone photo radical initiator or an acylphosphine oxide photo radical initiator is preferred from the viewpoint of excellent light curability. These photo radical initiators may be used alone or used by combination of two or more thereof.

As the acetophenone photo radical initiator described above, diethoxyacetophenone, 2-hydroxy-2-methyl-1-phenylpropan-1-one, benzyl dimethyl ketal, 4-(2-hydroxyethoxy)phenyl-(2-hydroxy-2-propyl) ketone, 1-hydroxy-cyclohexyl-phenyl-ketone, 2-methyl-2-morpholino(4-thiomethylphenyl)propan-1-one, 2-benzyl-2-dimethylamino-1-(4-morpholinophenyl)butanone, a 2-hydroxy-2-methyl-1-[4-(1-methylvinyl)phenyl]propanone oligomer or the like is exemplified, though the acetophenone photo radical initiator is not limited thereto. As a commercially available product, IRGACURE® 184 and DAROCUR® 1173 (manufactured by BASF SE), or the like is exemplified.

As the acylphosphine oxide photo radical initiator described above, bis(2,4,6-trimethylbenzoyl)-phenylphosphine oxide, 2,4,6-trimethylbenzoyl-diphenylphosphine oxide or the like is exemplified, though the acylphosphine oxide photo radical initiator is not limited thereto.

The organic peroxide as the component (C) used in the present invention is a compound that generates a radical species by heating at 50° C. or higher or through redox reaction. Redox reaction is preferably used because a radical species may be generated at room temperature. The organic peroxide is not particularly limited, but, for example, a ketone peroxide compound such as methyl ethyl ketone peroxide, cyclohexanone peroxide, 3,3,5-trimethylcyclohexanone peroxide, methylcyclohexanone peroxide, methyl acetoacetate peroxide, and acetylacetone peroxide; a peroxy ketal compound such as 1,1-bis(t-butylperoxy)-3,3,5-trimethylcyclohexane, 1,1-bis(t-butylperoxy)cyclohexane, 2,2-bis(t-butylperoxy)octane, n-butyl-4,4-bis(t-butylperoxy) valerate, and 2,2-bis(t-butylperoxy)butane; a hydroperoxide compound such as t-butyl hydroperoxide, cumene hydroperoxide, diisopropylbenzene hydroperoxide, p-menthane hydroperoxide, 2,5-dimethylhexane-2,5-dihydroperoxide, and 1,1,3,3-tetramethylbutyl hydroperoxide; a dialkyl peroxide compound such as di-t-butyl peroxide, t-butylcumyl peroxide, dicumyl peroxide, α,α'-bis(t-butylperoxy-m-isopropyl)benzene, 2,5-dimethyl-2,5-di(t-butylperoxy)hexane, and 2,5-dimethyl-2,5-di(t-butylperoxy)hexyne-3; a diacyl peroxide compound such as acetyl peroxide, isobutyryl peroxide, octanoyl peroxide, decanoyl peroxide, lauroyl peroxide, 3,5,5-trimethylhexanoyl peroxide, succinic acid peroxide, benzoyl peroxide, 2,4-dichlorobenzoyl peroxide, and m-toluoyl peroxide; a peroxydicarbonate compound such as diisopropyl peroxydicarbonate, di-2-ethylhexyl peroxydicarbonate, di-n-propyl peroxydicarbonate, bis-(4-t-butylcyclohexyl) peroxydicarbonate, dimyristyl peroxydicarbonate, di-2-ethoxyethyl peroxydicarbonate, dimethoxyisopropyl peroxydicarbonate, di(3-methyl-3-methoxybutyl) peroxydicarbonate, and diallyl peroxydicarbonate; a peroxyester compound such as t-butyl peroxyacetate, t-butyl peroxyisobutyrate, t-butyl peroxypivalate, t-butyl peroxyneodecanoate, cumyl peroxyneodecanoate, t-butyl ethyl peroxyhexanoate, t-butyl peroxy-3,5,5-trimethylhexanoate, t-butyl peroxylaurate, t-butyl peroxybenzoate, di-t-butyl peroxyisophthalate, 2,5-dimethyl-2,5-di(benzoylperoxy)hexane, t-butyl peroxymaleic acid, t-butyl peroxyisopropylcarbonate, cumyl peroxyoctoate, t-hexyl peroxyneodecanoate, t-hexyl peroxypivalate, t-butyl peroxyneohexanoate, t-hexyl peroxyneohexanoate, and cumyl peroxyneohexanoate; and acetylcyclohexylsulfonyl peroxide and t-butyl peroxyallylcarbonate are exemplified. These organic peroxides may be used alone or used by combination of two or more thereof. Among them, a dialkyl peroxide compound, a peroxydicarbonate compound, or a peroxyester compound is preferably used from the viewpoint of curability. As the organic peroxide suitable for redox reaction, a dialkyl peroxide compound is exemplified.

In the case of using an organic peroxide as the component (C), a curing accelerator may be mixed therewith for the purpose of accelerating redox reaction. Such a curing accelerator is not particularly limited, but saccharin (o-benzoic sulfimide), a hydrazine compound, an amine compound, a mercaptan compound, an organic metal compound or the like is preferably used. These curing accelerators may be used alone or used by combination of two or more thereof. Use by combination is more preferred because a curing-accelerating effect is favorable.

As the hydrazine compound, 1-acetyl-2-phenylhydrazine, 1-acetyl-2(p-tolyl)hydrazine, 1-benzoyl-2-phenylhydrazine, 1-(1',1',1'-trifluoro)acetyl-2-phenylhydrazine, 1,5-diphenylcarbohydrazine, 1-formyl-2-phenylhydrazine, 1-acetyl-2-(p-bromophenyl)hydrazine, 1-acetyl-2-(p-nitrophenyl)hydrazine, 1-acetyl-2-(2'-phenylethylhydrazine), ethyl carbazate, p-nitrophenylhydrazine, p-trisulfonyl hydrazide or the like is exemplified.

As the amine compound, for example, heterocyclic secondary amine such as 2-ethylhexylamine, 1,2,3,4-tetrahydroquinone, and 1,2,3,4-tetrahydroquinaldine; heterocyclic tertiary amine such as quinoline, methylquinoline, quinaldine, quinoxaline, and phenazine; aromatic tertiary amine such as N,N-dimethyl-para-toluidine, N,N-dimethyl-anisidine, and N,N-dimethylaniline; and an azole compound such as 1,2,4-triazole, oxazole, oxadiazole, thiadiazole, benzotriazole, hydroxybenzotriazole, benzoxazole, 1,2,3-benzothiadiazole, and 3-mercaptobenzotriazole are exemplified.

As the mercaptan compound, n-dodecylmercaptan, ethylmercaptan, butylmercaptan, tris-[(3-mercaptopropionyloxy)-ethyl]-isocyanurate, pentaerythritol tetrakis(3-mercaptopropionate), dipentaerythritol hexakis(3-mercaptopropionate), trimethylolpropane tris(3-mercaptopropionate), trimethylolpropane tris thioglycolate, pentaerythritol tetrakis thioglycolate or the like is exemplified.

As the organic metal compound, iron pentadione, cobalt pentadione, cobalt neodecanoate, copper pentadione, copper propylenediamine, copper ethylenediamine, copper neodecanoate, iron naphthenate, nickel naphthenate, cobalt naphthenate, copper naphthenate, copper octoate, iron hexoate, iron propionate, vanadium acetylacetone or the like is exemplified.

The adhesive composition of the present invention may be used as a one-component composition, but may be used as a two-component composition. In the form of a two-component composition, preferably, one liquid comprises the radical polymerization initiator as the component (C), and the other liquid comprises an organic metal compound. The radical polymerization initiator as the component (C) and the organic metal compound thus divided in separate liquids may suppress useless reaction during storage and may enhance storage stability. When used, the two liquids may be mixed or may be contacted with each other by separate application, and cured. In this context, components other than the radical polymerization initiator as the component (C) and the organic metal compound may be contained in divided portions at an arbitrary ratio in any liquid.

<Optional Component>

In the present invention, an additive such as an adhesive aid (e.g., a silane coupling agent), a thickener, an elastomer, a core-shell polymer, a reactive diluent, a nonreactive diluent or solvent, an antioxidant, a light stabilizer, a filler, a tackiness-imparting agent (e.g., a tackifier), a vinyl aromatic compound, a paraffin, a nonreactive colorant, phosphate, fine rubber polymer particles, a preservation stabilizer (e.g., BHT), a plasticizer, a dye, a pigment, a flame retardant, a sensitizer, a heavy metal inactivator, an ion trapping agent, an emulsifier, a water dispersion stabilizer, an antifoaming agent, a mold release agent, a leveling agent, a wax, a rheology controlling agent, or a surfactant may be mixed in an appropriate amount into the adhesive composition as long as the object of the present invention is not deteriorated.

As the silane coupling agent, for example, a glycidyl group-containing silane coupling agent such as 3-glycidoxypropylmethyldimethoxysilane, 3-glycidoxypropylmethyldiethoxysilane, 3-glycidoxypropylmethyldipropyloxysilane, 3-glycidoxypropyldimethylmonomethoxysilane, 3-glycidoxypropyldimethylmonoethoxysilane, 3-glycidoxypropyldimethylmonopropyloxysilane, 2-(3,4-epoxycyclohexyl)ethyltrimethoxysilane, 3-glycidoxypropyltriethoxysilane, 3-glycidoxypropyltrimethoxysilane, and 3-glycidoxypropylmethyldiethoxysilane, a vinyl group-containing silane coupling agent such as vinyltris(β-methoxyethoxy)silane, vinyltriethoxysilane, and vinyltrimethoxysilane, a (meth)acryl group-containing silane coupling agent such as 3-methacryloxypropylmethyldimethoxysilane, 3-methacryloxypropylmethyldiethoxysilane, 3-methacryloxypropyldimethylmonomethoxysilane, 3-methacryloxypropyldimethylmonoethoxysilane, 3-acryloxypropylmethyldipropyloxysilane, 3-acryloxypropylmethyldimethoxysilane, 3-acryloxypropylmethyldiethoxysilane, 3-acryloxypropylmethyldipropyloxysilane, 3-acryloxypropyldimethylmonopropyloxysilane, 3-acryloxypropyldimethylmonomethoxysilane, 3-acryloxypropyldimethylmonoethoxysilane, 3-acryloxypropyldimethylmonopropyloxysilane, and γ-methacryloxypropyltrimethoxysilane, an amino group-containing silane coupling agent such as N-β-(aminoethyl)-γ-aminopropyltrimethoxysilane, γ-aminopropyltriethoxysilane, and N-phenyl-γ-aminopropyltrimethoxysilane, and others such as γ-mercaptopropyltrimethoxysilane and γ-chloropropyltrimethoxysilane are exemplified. These silane coupling agents may be used alone or used by combination of two or more thereof.

The thickener is effectively polybutyl methacrylate or the like having a molecular weight of approximately 10,000 to approximately 40,000. Use of the thickener may increase the viscosity of an adhesive agent so as to attain the consistency of a viscous syrup having better applicability. Such a thickener may generally be used in an amount of approximately 50% by mass or less with respect to the total mass of the adhesive composition.

In the adhesive composition of the present invention, an elastomer may be used. The elastomer material may improve the fracture toughness of a cured product of the adhesive composition. This may be beneficial, for example, for the adhesion of a rigid high-yield strength material (e.g., a metal base material that does not mechanically absorb energy as easily as other materials such as a flexible polymer base material). Such an additive may generally be used in an amount of approximately 50% by mass or less with respect to the total mass of the adhesive composition.

The elastomer for use in the adhesive composition of the present invention is preferably a polymer substance having rubber elasticity at ordinary temperature, and may be preferably dissolved or dispersed in a polymerizable vinyl monomer.

As such an elastomer, a butadiene (co)polymer such as polybutadiene, a (meth)acrylonitrile-butadiene-(meth) acrylic acid copolymer, a (meth)acrylonitrile-butadiene-methyl (meth)acrylate copolymer, a methyl (meth)acrylate-butadiene-styrene copolymer (MBS), styrene-butadiene, a (meth)acrylonitrile-butadiene rubber (NBR), and various synthetic rubbers such as linear polyurethane, natural rubber, various thermoplastic elastomers or the like is exemplified. One or more of these elastomers may be used as long as there is no problem with compatibility.

The applicability and flow characteristics of an adhesive composition may be improved using a core-shell polymer. The improved applicability and flow characteristics may be confirmed from reduction in undesired string which remains when an adhesive composition is distributed from a syringe-type applicator or sag after application of an adhesive composition to a vertical plane. The core-shell polymer may generally be added in an amount of approximately 5% by mass or more, approximately 10% by mass or more, or approximately 20% by mass or more, and approximately 50% by mass or less, approximately 40% by mass or less, or approximately 30% by mass or less with respect to the total mass of an adhesive composition.

A reactive diluent may be added. As a suitable reactive diluent, a 1,4-dioxo-2-butene functional compound and an aziridine compound are exemplified.

As other additives, a nonreactive diluent or solvent (e.g., acetone, methyl ethyl ketone, ethyl acetate, and N-methylcaprolactam), a nonreactive colorant, a filler (e.g., carbon black, polyethylene, hollow glass/ceramic beads, silica, titanium dioxide, a solid glass/ceramic microsphere, a silica-alumina ceramic microsphere, a conductive and/or heat conductive particle, an antistatic compound, and chalk) or the like is exemplified. Various optional additives may be added in amounts that do not essentially reduce the polymerization rate of a monomer or the desired characteristics of a cured product of the adhesive composition.

Various antioxidants or the like including a polymerization inhibitor may be further used for the purpose of improving storage stability. As the antioxidant, hydroquinone, hydroquinone monomethyl ether, 2,6-di-tertiary butyl-p-cresol, 2,2'-methylenebis(4-methyl tertiary butylphenol), triphenyl phosphite, phenothiazine, N-isopropyl-N'-phenyl-p-phenylenediamine or the like is exemplified.

The amount of the antioxidant used is preferably 0.001 to 3 parts by mass, more preferably 0.01 to 1 parts by mass, with respect to 100 parts by mass of the radically polymerizable compound (A). The amount of 0.001 parts by mass or more is effective. When the amount is 3 parts by mass or less, adhesion properties are improved.

Among the optional components described above, an antioxidant and a light stabilizer are preferably added for improving the weather resistance of an adhesive composition. As the antioxidant and the light stabilizer, commercially available products may be used. SUMILIZER® BHT, SUMILIZER® 5, SUMILIZER® BP-76, SUMILIZER® MDP-S, SUMILIZER® GM, SUMILIZER® BBM-S, SUMILIZER® WX-R, SUMILIZER® NW, SUMILIZER® BP-179, SUMILIZER® BP-101, SUMILIZER® GA-80, SUMILIZER® TNP, SUMILIZER® TPP-R, and SUMILIZER® P-16 (manufactured by Sumitomo Chemical Co., Ltd.), ADEKASTAB® AO-20, ADEKASTAB® AO-30, ADEKASTAB® AO-40, ADEKASTAB® AO-50, ADEKASTAB® AO-60, ADEKASTAB® AO-70, ADEKASTAB® AO-80, ADEKASTAB® AO-330, ADEKASTAB® PEP-4C, ADEKASTAB® PEP-8, ADEKASTAB® PEP-24G, ADEKASTAB® PEP-36, ADEKASTAB® HP-10, ADEKASTAB® 2112, ADEKASTAB® 260, ADEKASTAB® 522A, ADEKASTAB® 329K, ADEKASTAB® 1500, ADEKASTAB® C, ADEKASTAB® 135A, and ADEKASTAB® 3010 (manufactured by ADEKA Corp.), TINUVIN® 770, TINUVIN® 765, TINUVIN® 144, TINUVIN® 622, TINUVIN® 111, TINUVIN® 123, and TINUVIN® 292 (manufactured by Ciba Specialty Chemicals (BASF SE)) or the like is exemplified. The amount of such an antioxidant and a light stabilizer mixed is not particularly limited, but is preferably 0.001 to 10 parts by mass, more preferably 0.01 to 5 parts by mass, with respect to 100 parts by mass of the component (A).

<Base Material to which Adhesive Composition is Applicable>

The adhesive composition of the present invention is particularly useful for the adhesion of a low-surface energy plastic or polymer base material, which is a difficult-to-bond material, without the use of a complicated surface treatment technique such as flame treatment, ITRO treatment, corona discharge, or primer treatment. As the "low-surface energy plastic" according to the present disclosure, an olefin material such as polyethylene (PE), polypropylene (PP), cycloolefin polymer (COP), and cycloolefin copolymer (COC), polyacetal (POM), nylon 6 (PA6), polyethylene terephthalate (PET), polybutylene terephthalate (PBT), polydimethylsilicone (PDMS), polyether ether ketone (PEEK), modified polyphenylene ether (PPE), polyphenylene sulfide (PPS), polymethylpentene (PMP), liquid crystal polyester (LCP), acrylonitrile-butadiene-styrene (ABS), a fluorinated polymer such as polytetrafluoroethylene (PTFE), and elastomer-modified forms of these materials, and polymer blends of these materials and elastomers such as ethylene-propylene rubber (EPM) or ethylene-propylene-diene rubber (EPDM) are exemplified. As the "high-surface energy plastic" according to the present disclosure, polyvinyl chloride (PVC), polycarbonate (PC), and polymethyl methacrylate (PMMA) are exemplified. The two-component adhesive agent of the present disclosure may be advantageously used for a base material containing an elastomer-modified form or a polymer blend of an elastomer which tends to adsorb oxygen. As a suitable base material containing an elastomer-modified form or a polymer blend of an elastomer, an olefin elastomer base material containing an elastomer-modified form of polyolefin such as polyethylene or polypropylene, or a polymer blend of an elastomer such as ethylene-propylene rubber (EPM) or ethylene-propylene-diene rubber (EPDM) and polyethylene, polypropylene or the like, particularly, a polypropylene elastomer base material containing an elastomer-modified form of polypropylene or a polymer blend of an elastomer such as ethylene-propylene rubber (EPM) or ethylene-propylene-diene rubber (EPDM) and polypropylene is exemplified. The present invention is not limited thereby, and the composition may be used for the adhesion of any thermoplastic resin, wood, ceramic, concrete, undercoated metal, and fiber-reinforced plastic.

<Production Method>

The adhesive composition of the present invention may be produced by a conventional method known in the art. The adhesive composition of the present invention may be produced, for example, by adding predetermined amounts of the components (A) to (C), and mixing the components using a mixing unit such as a mixer at a temperature of preferably 10 to 70° C. for preferably 0.1 to 5 hours. The production is preferably performed in a light-shielded environment.

<Application Method>

As a method for applying the adhesive composition of the present invention to an adherend, a method for sealing agents or adhesive agents known in the art is used. For example, a method such as dispensing using an automatic applicator, spray, ink jet, screen printing, gravure printing, dipping, or spin coating may be used. The adhesive composition of the present invention is preferably in a liquid state at 25° C. from the viewpoint of applicability. The liquid state at 25° C. exhibits viscosity of 0.01 to 1000 Pa·s in a cone and plate viscometer at 25° C.

<Curing Method and Cured Product>

The curing pattern of the adhesive composition of the present invention may be selected from light curing, heat curing and redox curing depending on the selected component (C) of the present invention. For example, in the case of imparting "light curability" to the adhesive composition, a photo radical initiator may be selected. In the case of imparting "heat curing or curing through redox reaction" thereto, an organic peroxide may be selected.

As for curing conditions for imparting light curability to the adhesive composition of the present invention, a light source in the curing of the adhesive composition of the present invention by irradiation with light such as ultraviolet ray or visible light is not particularly limited, and a low-pressure mercury lamp, a medium-pressure mercury lamp, a high-pressure mercury lamp, an ultrahigh-pressure mercury lamp, a black light lamp, a microwave-excited mercury lamp, a metal halide lamp, a sodium lamp, a halogen lamp, a xenon lamp, LED, a fluorescent lamp, sunlight, an electron beam irradiation apparatus or the like is exemplified. The irradiance of light irradiation is preferably 500 $mJ/cm^2$ or more, more preferably 1000 $mJ/cm^2$ or more, from the viewpoint of the characteristics of a cured product. The upper limit is not particularly limited, but is, for example, 10000 $mJ/cm^2$ or less.

Curing conditions for imparting heat curability to the adhesive composition of the present invention are not particularly limited, but involve, for example, a temperature of preferably 45° C. or higher and lower than 200° C., more preferably 50° C. or higher and lower than 150° C. The curing time is not particularly limited, but is preferably 3 minutes or longer and shorter than 5 hours, more preferably 10 minutes or longer and 3 hours or shorter, for the temperature of 45° C. or higher and lower than 200° C. A cured product obtained by curing the adhesive composition of the present invention is also included in the embodiments of the present invention. A conjugate obtained through adhesion with the adhesive composition of the present invention is also included in the embodiments of the present invention.

<Compact>

The compact of the present invention is obtained by applying the adhesive composition described above onto a plastic base material, and cured layer is directly disposed on the base material or between base materials.

<Purpose>

As a specific purpose, the adhesive composition of the present invention may be used, for example, in the adhesion of a switch portion for an automobile, a headlight, an engine interior component, an electric component, a drive engine, a brake oil tank, a front hood, a fender, a body panel such as a door, a window, or the like in automobile and transport plane fields; in the adhesion of a liquid crystal display, organic electroluminescence, a light emitting diode display apparatus, or a field emission display in flat panel displays; in the adhesion of a video disc, CD, DVD, MD, a pickup lens, a peripheral of a hard disc (a member for a spindle motor, a member for a magnetic head actuator, etc.), a Blu-ray disc, or the like in a recording field; as a sealing material for electronic components, electric circuits, electric contact points or semiconductor devices, etc., a die bond agent, a conductive adhesive agent, an anisotropic conductive adhesive agent, an interlayer adhesive agent for multilayer substrates including buildup substrates, a solder resist, or the like in an electronic material field; in the adhesion of a lithium battery, a manganese battery, an alkaline battery, a nickel battery, a fuel battery, a silicon solar cell, a dye-sensitized solar cell, an organic solar cell, or the like in a battery field; as an adhesive agent for peripherals of light switches in optical transmission systems, peripheral optical fiber materials of optical connectors, optical passive components, optical circuit components, peripherals of optoelectronic integrated circuits, or the like in an optical component field; as an adhesive agent for camera modules, materials for still camera lenses, finder prisms, target prisms, finder covers, light receptive sensors, photography lenses, projector lenses of projection televisions, or the like in an optical equipment field; and in the adhesion of a gas pipe, a water pipe, or the like, as a lining material, for sealing, for casting, for shaping, or as a coating material, or the like in an infrastructure field.

For example, PP (polypropylene), PE (polyethylene), polyurethane, ABS, phenol resin, CFRP (carbon fiber-reinforced plastic), and GFRP (glass fiber-reinforced plastic) are used as resins for use in the automobile and transport plane fields. Particularly, for car bodies, CFRP (carbon fiber-reinforced plastic) or GFRP (glass fiber-reinforced plastic) is used. An electrolyte membrane frame of the fuel battery is constituted by a difficult-to-bond material such as PP or PEN. As an adhesion site in the camera module, a site between an image sensor such as CMOS or CCD and a substrate, a site between a cut filter and a substrate, a site between a substrate and a housing, a site between a housing and a cut filter, a site between a housing and a lens unit or the like is exemplified. The material of the housing or the lens unit is made of a difficult-to-bond material such as LCP (liquid crystal polymer), PPS (polyphenylene sulfide), or polycarbonate.

EXAMPLES

Hereinafter, the present invention will be described in more detail with reference to Examples. However, the present invention is in no way limited to these Examples. In Examples given below, operations were performed under conditions of room temperature (25° C.) and a relative humidity of 40 to 50% RH unless otherwise specified.

(Synthesis Example 1) Synthesis of N,N-bis(4-(1,1,3,3-tetramethylbutyl)phenyl) acrylamide (DOPAA)

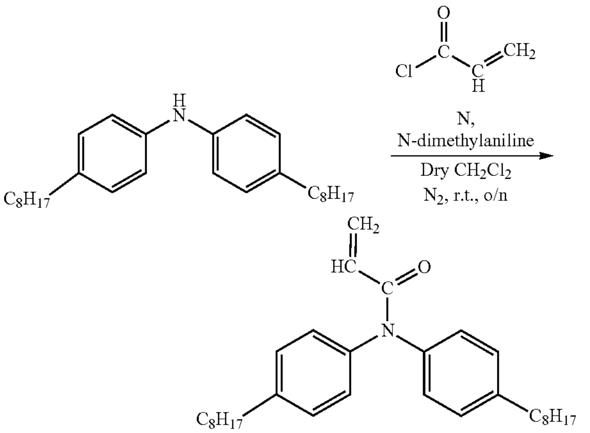

To a 1 L four-neck flask purged with nitrogen, bis[4-(1,1,3,3-tetramethylbutyl)phenyl]amine (50.00 g, 0.127 mol), N,N-dimethylaniline (46.17 g, 0.381 mol), and 477 mL of super dehydrated dichloromethane were added, and stirred until uniformly dissolved. Subsequently, the reaction solution was cooled to 0° C. or lower in an ice/ethanol bath, and acrylic acid chloride (22.99 g, 0.254 mol) was slowly added dropwise thereto, followed by stirring for 30 minutes. Then, the reaction solution was warmed to room temperature and reacted for 24 hours. After the completion of reaction, the solvent was distilled off with an evaporator, and the crude product was dissolved in 250 mL of ethyl acetate. Then, the solution was washed with a 1 N aqueous hydrochloric acid solution, a saturated aqueous solution of sodium bicarbonate, and saline. The organic layer was dehydrated over magnesium sulfate, and the filtrate was then distilled off with an evaporator. The obtained crude product was recrystallized and purified with hexane to obtain N,N-bis(4-(1,1,3,3-tetramethylbutyl)phenyl)acrylamide (38.67 g, percent yield: 68%). Results of mass spectrometry will be shown below. High Resolution ESI-TOF-MS m/z Calcd. for $[C_{31}H_{45}NO([M+Na^+])]$: 470.3393. found 470.3317.

(Synthesis Example 2) Production of Adhesive Polymer 1 (DOPAA/EA=90/10)

To a 300 mL four-neck flask, 26.98 g of DOPAA, 3.04 g of ethyl acrylate (EA: a product of Tokyo Chemical Industry Co., Ltd.), and 0.20 g of AIBN (a product of Tokyo Chemical Industry Co., Ltd.) were added, and dissolved in 45 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=28.19 g, Mn=36,148, Mw/Mn=2.08

(Synthesis Example 3) Production of Adhesive Polymer 2 (DOPAA/EA=90/10)

To a 300 mL four-neck flask, 26.98 g of DOPAA, 3.04 g of ethyl acrylate (EA: a product of Tokyo Chemical Industry Co., Ltd.), and 0.17 g of AIBN (a product of Tokyo Chemical Industry Co., Ltd.) were added, and dissolved in 45 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=26.33 g, Mw=46,229, Mw/Mn=2.07

(Synthesis Example 4) Production of Adhesive Polymer 3 (DOPAA/EA=90/10)

To a 300 mL four-neck flask, 26.98 g of DOPAA, 3.04 g of ethyl acrylate (EA: a product of Tokyo Chemical Industry Co., Ltd.), and 0.15 g of AIBN (a product of Tokyo Chemical Industry Co., Ltd.) were added, and dissolved in 45 g of toluene. Deaeration was performed by the application of pressure reduction operation, and the mixture was heated and stirred at 65° C. for 6 hours in a nitrogen atmosphere. Then, 0.08 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=25.98 g, Mw=53,810, Mw/Mn=2.11

(Synthesis Example 5) Production of Adhesive Polymer 4 (DOPAA/EA=90/10)

To a 300 mL four-neck flask, 26.98 g of DOPAA, 3.04 g of ethyl acrylate (EA: a product of Tokyo Chemical Industry Co., Ltd.), and 0.20 g of AIBN (a product of Tokyo Chemical Industry Co., Ltd.) were added, and dissolved in 40.62 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=27.82 g, Mw=58,078, Mw/Mn=2.20

(Synthesis Example 6) Production of Adhesive Polymer 5 (DOPAA/EA=90/10)

To a 300 mL four-neck flask, 26.98 g of DOPAA, 3.04 g of ethyl acrylate (EA: a product of Tokyo Chemical Industry Co., Ltd.), and 0.20 g of AIBN (a product of Tokyo Chemical Industry Co., Ltd.) were added, and dissolved in 36.69 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=29.01 g, Mw=61,128, Mw/Mn=2.10

(Synthesis Example 7) Production of Adhesive Polymer 6 (DOPAA/EA=90/10)

To a 300 mL four-neck flask, 26.98 g of DOPAA, 3.04 g of ethyl acrylate (EA: a product of Tokyo Chemical Industry Co., Ltd.), and 0.20 g of AIBN (a product of Tokyo Chemical Industry Co., Ltd.) were added, and dissolved in 33.18 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=28.87 g, Mw=69,610, Mw/Mn=2.20

(Synthesis Example 8) Production of Adhesive Polymer 7 (DOPAA/EA=90/10)

To a 300 mL four-neck flask, 26.98 g of DOPAA, 3.04 g of ethyl acrylate (EA: a product of Tokyo Chemical Industry Co., Ltd.), and 0.20 g of AIBN (a product of Tokyo Chemical Industry Co., Ltd.) were added, and dissolved in 30.02 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=27.31 g, Mw=82,555, Mw/Mn=2.38

(Synthesis Example 9) Production of Adhesive Polymer 8 (DOPAA/EA=90/10)

To a 300 mL four-neck flask, 26.98 g of DOPAA, 3.04 g of ethyl acrylate (EA: a product of Tokyo Chemical Industry Co., Ltd.), and 0.20 g of AIBN (a product of Tokyo Chemical Industry Co., Ltd.) were added, and dissolved in 20.02 g of toluene. Deaeration was performed by the application of pressure reduction operation, and the mixture was heated and stirred at 65° C. for 6 hours in a nitrogen atmosphere. Then, 0.10 g of AIBN was added thereto, and the mixture was stirred at 80° C. for 5 hours. While heating and stirring were terminated, the reaction solution was sampled and subjected to gel permeation chromatography measurement. The reaction solution was added dropwise into 800 mL of methanol for powdering. The obtained precipitates were filtered off and dried under reduced pressure at 60° C. in a vacuum dryer. Yield=28.11 g, Mw=108,606, Mw/Mn=2.94

(Preparation of Adhesive Composition)

The respective components in the amounts shown in Tables 1 to 4 were stirred and mixed at 25° C. in a light-shielded environment to obtain adhesive compositions.

In Tables 1 to 4, the amount of each substance mixed is indicated by parts by mass. The details of each mixed substance are as described below.

IBOX: Isobornyl acrylate, a commercially available product

EHA: 2-Ethylhexyl acrylate, a commercially available product

TPO: Diphenyl(2,4,6-trimethylbenzoyl)phosphine oxide, a commercially available product A testing method used in Examples of Tables 1 to 4 is as described below.

(Adherend)

First Adherend

High-density polyethylene (HDPE), Low-density polyethylene (LDPE), polypropylene (PP), cycloolefin polymer (COP), cycloolefin copolymer (COC), polyacetal (POM), nylon 6 (PA6), polyethylene terephthalate (PET), polybutylene terephthalate (PBT), polydimethylsilicone (PDMS), polyether ether ketone (PEEK), modified polyphenylene ether (PPE), polyphenylene sulfide (PPS), polymethylpentene (PMP), liquid crystal polyester (LOP), acrylonitrile-butadiene-styrene (ABS), polytetrafluoroethylene (PTFE), polyvinyl chloride (PVC), polymethyl methacrylate (PMMA), and polystyrene (PS) were used. All the base materials used had a size of 2.0 mm thick×25 mm×100 mm. All the base materials used were commercially available products.

Second Adherend

Polycarbonate (PC) having a size of 2.0 mm thick×25 mm×100 mm was used. The base material used was a commercially available product.

(Production of Test Piece)

Each light-curable adhesive composition was applied to the first adherend so as to be 100 μm thick.

Subsequently, the second adherend PC (polycarbonate) was bonded thereto such that the adhesion area was 25 mm×25 mm. Then, the adhesive composition was cured by irradiation with ultraviolet ray in a cumulative amount of light of 2000 mJ/m$^2$ to prepare a test piece.

(Tensile Shear Strength (Tensile Shear Adhesive Strength))

Tensile shear strength (unit: MPa) was measured to determine tensile shear strength. The measurement was performed at a pulling speed of 100 mm/min in an environment involving a temperature of 23° C.

TABLE 1

| | Reagent | Example 1 | Example 2 | Example 3 | Example 4 | Example 5 | Example 6 | Example 7 | Example 8 |
|---|---|---|---|---|---|---|---|---|---|
| Adhesive polymer | (A) IBOX | 50 | 50 | 50 | 50 | 50 | 50 | 50 | 50 |
| | EHA | 50 | 50 | 50 | 50 | 50 | 50 | 50 | 50 |
| | (B) Adhesive polymer 1 | 10 | | | | | | | |
| | Adhesive polymer 2 | | 10 | | | | | | |
| | Adhesive polymer 3 | | | 10 | | | | | |
| | Adhesive polymer 4 | | | | 10 | | | | |
| | Adhesive polymer 5 | | | | | 10 | | | |

TABLE 1-continued

| | Reagent | Example 1 | Example 2 | Example 3 | Example 4 | Example 5 | Example 6 | Example 7 | Example 8 |
|---|---|---|---|---|---|---|---|---|---|
| | Adhesive polymer 6 | | | | | | 10 | | |
| | Adhesive polymer 7 | | | | | | | 10 | |
| | Adhesive polymer 8 | | | | | | | | 10 |
| | (C) TPO | 4 | 4 | 4 | 4 | 4 | 4 | 4 | 4 |
| Adherend | | PC/PP | PC/PP | PC/PP | PC/PP | PC/PP | PC/PP | PC/PP | PC/PP |
| Evaluation | Tensile shear adhesive strength/MPa | 1.87 | 1.91 | 1.90 | 2.31 | 2.44 | 2.37 | 1.61 | 1.03 |
| | Fracture mechanism | Interface | Interface | Interface | PP fracture | PP fracture | PP fracture | Interface | Interface |

*Evaluation (fracture mechanism): Fracture at the interface between the base material and the adhesive agent was referred to as "interface fracture", and the fracture or break of the base material (PP) was referred to as "PP fracture".

TABLE 2

| | Reagent | Example 9 | Example 10 | Example 11 | Example 12 | Example 13 | Example 14 | Example 15 | Example 16 |
|---|---|---|---|---|---|---|---|---|---|
| Adhesive polymer | (A) IBOX | 50 | 50 | 50 | 50 | 50 | 50 | 50 | 50 |
| | EHA | 50 | 50 | 50 | 50 | 50 | 50 | 50 | 50 |
| | (B) Adhesive polymer 5 | 10 | 10 | 10 | 10 | 10 | 10 | 10 | 10 |
| | (C) TPO | 4 | 4 | 4 | 4 | 4 | 4 | 4 | 4 |
| Adherend | | HDPE/PC | LDPE/PC | COP/PC | COC/PC | PMP/PC | PTFE/PC | PDMS/PC | POM/PC |
| Evaluation | Tensile shear adhesive strength/MPa | 1.65 | 1.27 | 2.33 | 3.09 | 2.82 | 1.02 | 0.66 | 2.07 |
| | Fracture mechanism | HDPE fracture | LDPE fracture | Interface | Interface | Interface | PTFE fracture | PDMS fracture | Interface |

TABLE 3

| | Reagent | Example 17 | Example 18 | Example 19 | Example 20 | Example 21 | Example 22 | Example 23 | Example 24 |
|---|---|---|---|---|---|---|---|---|---|
| Adhesive polymer | (A) IBOX | 50 | 50 | 50 | 50 | 50 | 50 | 50 | 50 |
| | EHA | 50 | 50 | 50 | 50 | 50 | 50 | 50 | 50 |
| | (B) Adhesive polymer 5 | 10 | 10 | 10 | 10 | 10 | 10 | 10 | 10 |
| | (C) TPO | 4 | 4 | 4 | 4 | 4 | 4 | 4 | 4 |
| Adherend | | PET/PC | PBT/PC | LCP/PC | PA6/PC | PEEK/PC | PPE/PC | PPS/PC | PS/PC |
| Evaluation | Tensile shear adhesive strength/MPa | 3.88 | 2.97 | 2.22 | 2.39 | 2.00 | 2.76 | 2.30 | 2.84 |
| | Fracture mechanism | Interface | Interface | Interface | Interface | Interface | Interface | Interface | Interface |

TABLE 4

| | Reagent | Example 25 | Example 26 | Example 27 |
|---|---|---|---|---|
| Adhesive polymer | (A) IBOX | 50 | 50 | 50 |
| | EHA | 50 | 50 | 50 |
| | (B) Adhesive polymer 5 | 10 | 10 | 10 |
| | (C) TPO | 4 | 4 | 4 |
| Adherend | | ABS/PC | PMMA/PC | PVC/PC |
| Evaluation | Tensile shear adhesive strength/MPa | 3.50 | 3.11 | 3.41 |
| | Fracture mechanism | Interface | Interface | Interface |

As is evident from the test results, the adhesive composition of the present invention is excellent in adhesion properties for various plastic resins such as low-surface energy resin base materials, for example, polyethylene (PE), polypropylene (PP), polytetrafluoroethylene (PTFE), polyacetal (POM), nylon 6 (PA6), polyethylene terephthalate (PET), polybutylene terephthalate (PBT), polydimethylsilicone (PDMS), polyether ether ketone (PEEK), modified polyphenylene ether (PPE), polyphenylene sulfide (PPS), cycloolefin polymer (COP), cycloolefin copolymer (COC), polymethylpentene (PMP), and liquid crystal polyester (LCP), or high-surface energy resin base materials, for example, polyvinyl chloride (PVC), polycarbonate (PC), and polymethyl methacrylate (PMMA).

The adhesive composition of the present invention is capable of adhering to a wide range of base materials and may assume various composition forms.

Excellent adhesion properties to the various plastic resins cannot be obtained when the polymer having a repeat unit derived from a compound of formula (I) according to the present invention is not used or when another polymer or the like is used.

The invention claimed is:

1. An adhesive composition comprising the following components (A) to (C):

(A) a monofunctional or polyfunctional (meth)acrylate, (meth)acrylamide or an oligomer thereof;

(B) a polymer having a weight-average molecular weight of 35,000 to 110,000 and having a repeat unit derived from a polymerizable compound of formula (I'):

(I')

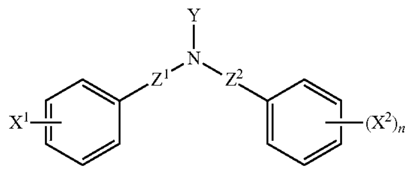

wherein $X^1$ and $X^2$ each independently represent a C7 to C20 alkyl group or a C7 to C20 alkoxy group, n represents 0 or 1, $Z^1$ and $Z^2$ each independently represent a single bond or a C1 to C3 alkylene group, and Y represents an acryloyl group or a methacryloyl, and a repeat unit derived from C1-12 alkyl (meth)acrylic acid ester, wherein the molar ratio between the repeat unit derived from a polymerizable compound of formula (I') and the repeat unit derived from C1-12 alkyl (meth)acrylic acid ester is 95:5 to 80:20; and (C) a radical polymerization initiator, wherein the component (B) is 1 to 80 parts by mass with respect to 100 parts by mass of the component (A), and the component (C) is 0.01 to 10 parts by mass with respect to 100 parts by mass of the component (A).

2. The adhesive composition according to claim 1, wherein the adhesive composition is an adhesive composition for a plastic base material.

3. The adhesive composition according to claim 1, wherein the radical polymerization initiator (C) is a photopolymerization initiator.

4. The adhesive composition according to claim 1, wherein the radical polymerization initiator (C) is an organic peroxide.

5. The adhesive composition according to claim 3, wherein the adhesive composition is a coating agent.

6. The adhesive composition according to claim 5, wherein the coating agent is a primer.

7. The adhesive composition according to claim 3, wherein the adhesive composition is an adhesive agent.

8. The adhesive composition according to claim 4, wherein the adhesive composition is an adhesive agent.

9. A compact obtained by applying the adhesive composition according to claim 1 onto a plastic base material, and curing the adhesive composition so that the resulting layer is disposed on the base material or between base materials.

* * * * *